United States Patent
Wakagi et al.

(10) Patent No.: US 8,068,138 B2
(45) Date of Patent: Nov. 29, 2011

(54) IMAGE PICKUP APPARATUS FOR REDUCING FIXED PATTERN NOISE

(75) Inventors: Toru Wakagi, Tokyo (JP); Nobuyuki Matsushita, Kanagawa (JP); Toshifumi Takaoka, Chiba (JP)

(73) Assignee: Sony Corporation (JP)

( * ) Notice: Subject to any disclaimer, the term of this patent is extended or adjusted under 35 U.S.C. 154(b) by 421 days.

(21) Appl. No.: 12/291,234

(22) Filed: Nov. 7, 2008

(65) Prior Publication Data

US 2009/0128636 A1     May 21, 2009

(30) Foreign Application Priority Data

Nov. 19, 2007 (JP) ................................ P2007-299471

(51) Int. Cl.
*H04N 5/228* (2006.01)
(52) U.S. Cl. .................................. 348/208.1; 348/218.1
(58) Field of Classification Search ............... 348/208.1, 348/218.1
See application file for complete search history.

(56) References Cited

U.S. PATENT DOCUMENTS

| | | | | |
|---|---|---|---|---|
| 7,123,292 B1* | 10/2006 | Seeger et al. | ............... | 348/218.1 |
| 2002/0126210 A1* | 9/2002 | Shinohara et al. | ............ | 348/219 |
| 2006/0232712 A1* | 10/2006 | Zhou et al. | ................... | 348/701 |
| 2007/0078498 A1* | 4/2007 | Rezai et al. | ..................... | 607/59 |
| 2007/0132857 A1* | 6/2007 | Grip et al. | .................. | 348/218.1 |

FOREIGN PATENT DOCUMENTS

| | | |
|---|---|---|
| JP | 1-154684 A | 6/1989 |
| JP | 2000-244797 A | 9/2000 |
| JP | 2007-214662 A | 8/2007 |

* cited by examiner

*Primary Examiner* — Timothy J Henn
*Assistant Examiner* — Usman Khan
(74) *Attorney, Agent, or Firm* — Lerner, David, Littenberg, Krumholz & Mentlik, LLP

(57) ABSTRACT

An image pickup apparatus includes an image pickup optical system having an optical axis and configured to form a subject image, an image pickup element configured to pick up the subject image and output the picked-up subject image as an image, an optical axis controller configured to displace an optical axis position relative to the image pickup element every time image capturing is performed, an image addition processor configured to correct positional displacement between a plurality of images output from the image pickup element and add the resulting images together, and an operation unit.

18 Claims, 11 Drawing Sheets

IMAGE PICKUP APPARATUS FOR REDUCING FIXED PATTERN NOISE

CROSS REFERENCES TO RELATED APPLICATIONS

The present application claims priority from Japanese Patent Application No. JP 2007-299471, filed in the Japanese Patent Office on Nov. 19, 2007, the entire contents content of which is incorporated herein by reference.

BACKGROUND OF THE INVENTION

1. Field of the Invention

The present invention relates to image pickup apparatuses, and particularly to an image pickup apparatus that adds captured images together.

2. Description of the Related Art

There have been proposed systems that are capable of adding a plurality of continuously captured images to form a less-noise high-quality image (e.g., see, Japanese Unexamined Patent Application Publication No. 2000-244797). Also, with recent advances in image processing technology, it has become possible to detect motion vectors between a plurality of continuously captured images, perform adjustment of positions of the captured images, add the resulting images together, and thus obtain a less-noise image.

SUMMARY OF THE INVENTION

However, when continuously captured images are added together as described above, fixed pattern noise (e.g., fixed defect, vertical stripe, or horizontal stripe) may be emphasized. Specifically, when a plurality of images are captured under conditions where optical image stabilization is effective or no image blur caused by handshake occurs because the image pickup apparatus is secured to a tripod or the like, the positions of optical axes relative to the image pickup element are the same among the captured images. As a result, fixed pattern noise n101 appears at the same position in every captured image (see A and B of FIG. 11). In this case, if the plurality of captured images are added together, the fixed pattern noise n101 is emphasized and becomes more noticeable (see C of FIG. 11) while random noise is suppressed and becomes less noticeable.

Accordingly, it is desirable to provide an image pickup apparatus capable of reducing fixed pattern noise even under conditions where optical image stabilization is effective or no image blur caused by handshake occurs.

To solve the problems described above, an image pickup apparatus according to an embodiment of the present invention includes an image pickup optical system having an optical axis and configured to form a subject image, an image pickup element configured to pick up the subject image and output the picked-up subject image as an image, an optical axis controller configured to displace an optical axis position relative to the image pickup element every time image capturing is performed, an image addition processor configured to correct positional displacement between a plurality of images output from the image pickup element and add the resulting images together, and an operation unit.

According to an embodiment of the present invention, since the optical axis position relative to the image pickup element is displaced every time image capturing is performed, the position of fixed pattern noise can be displaced for each captured image. Therefore, when positional displacement between images is corrected and the resulting images are added together, fixed pattern noise in one image can be prevented from overlapping with that in another image.

As described above, according to an embodiment of the present invention, fixed pattern noise can be reduced even under conditions where optical image stabilization is effective or no image blur caused by handshake occurs. Thus, it is possible to provide a high-quality image.

DESCRIPTION OF THE PREFERRED EMBODIMENTS

First Embodiment

An overview of a first embodiment of the present invention will now be described.

Figure 1:
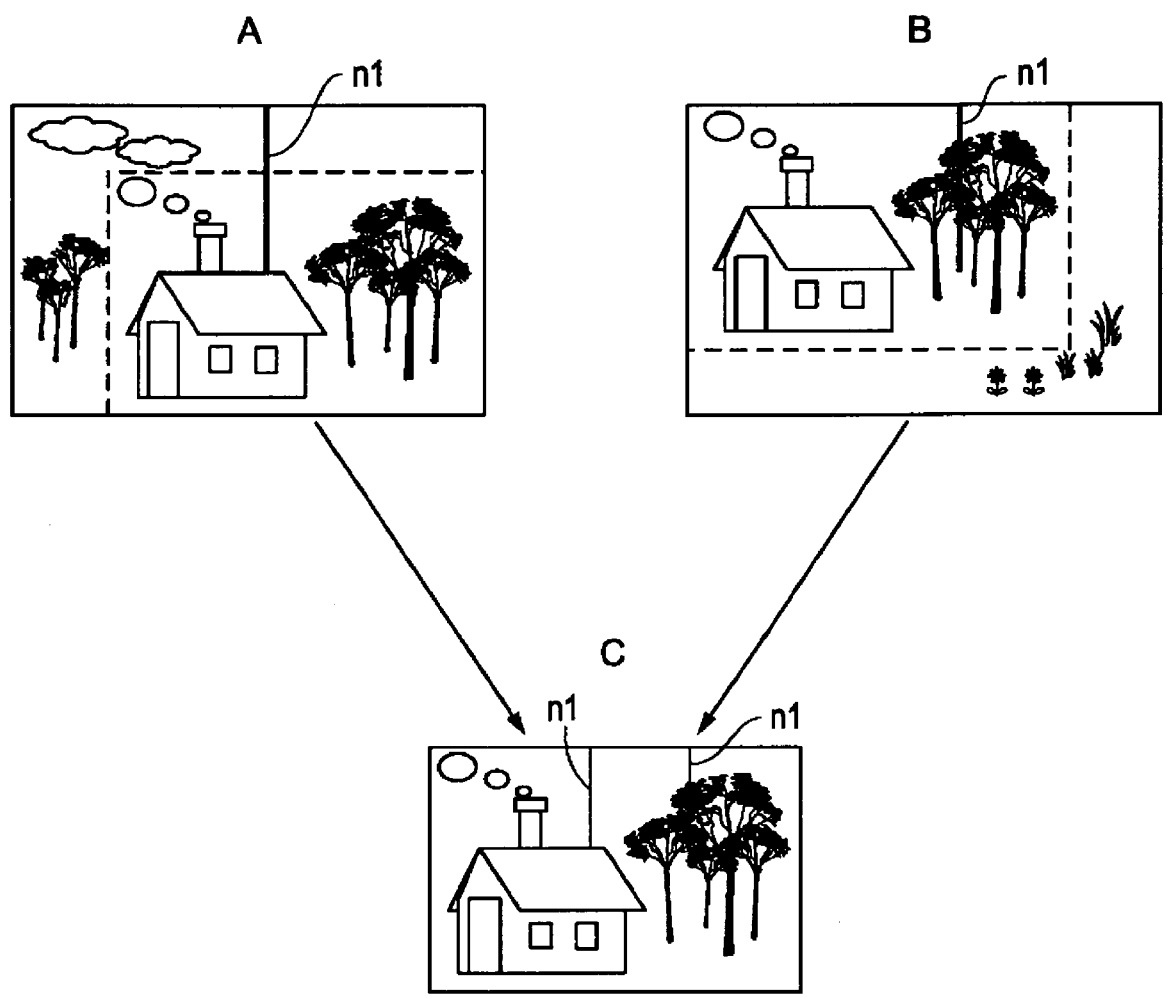
FIG. 1 is a diagram illustrating an overview of a first embodiment of the present invention.

An image pickup apparatus of the first embodiment is configured to intentionally displace an optical axis relative to a solid-state image pickup element every time image capturing is performed. Thus, for example, as illustrated in A and B of FIG. 1, the position of fixed pattern noise n1 can be displaced for each captured image. When a plurality of images having the fixed pattern noise n1 at different positions are added together, the fixed pattern noise n1 appears at different positions in the resulting image, as illustrated in C of FIG. 1. Therefore, in an image obtained by adding a plurality of images together, the level of fixed pattern noise n1 can be reduced. The processing described above is applicable not only to a moving image, but also to still images continuously captured (e.g., in a continuous image capturing mode).

Figure 2:
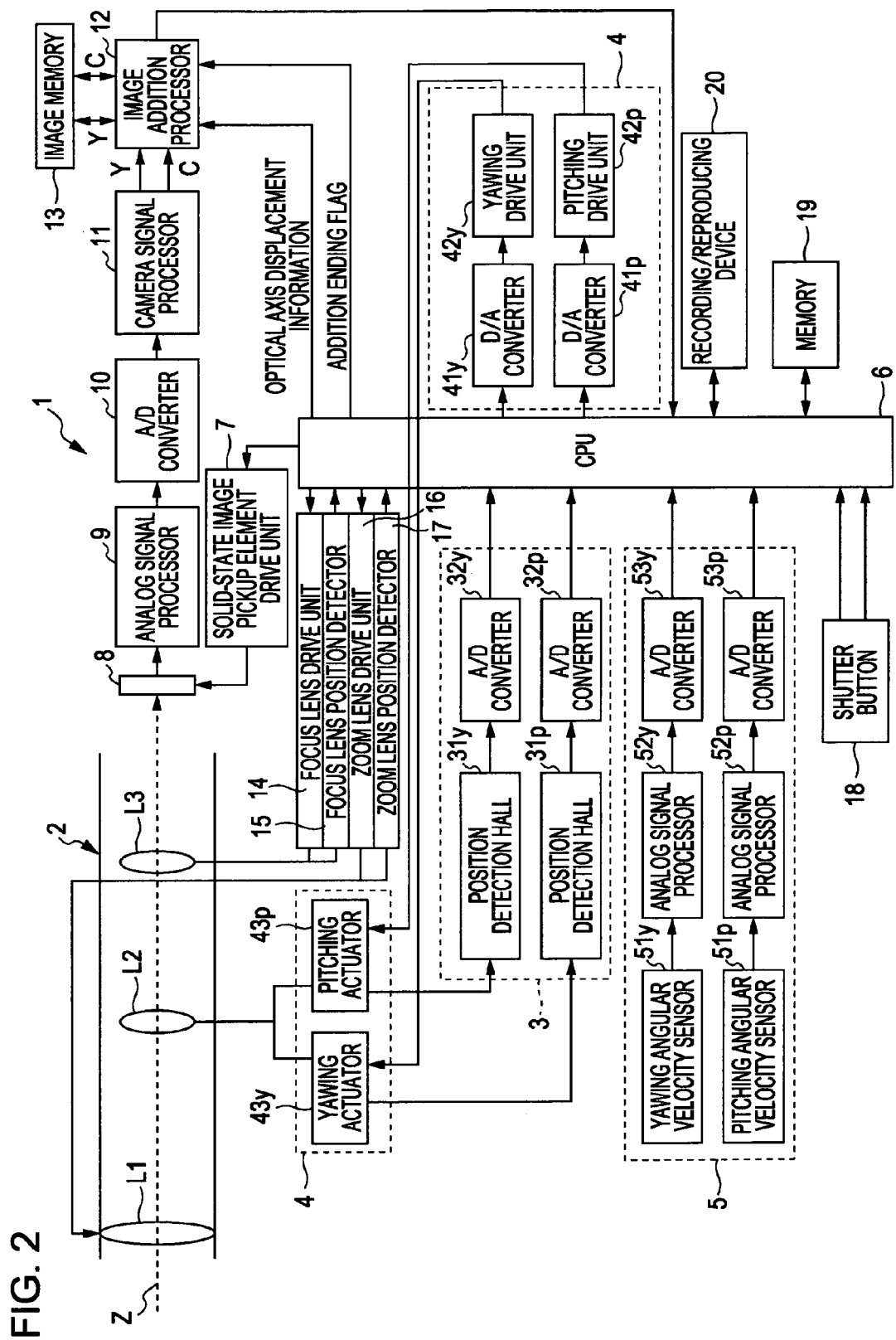
FIG. 2 is a block diagram illustrating a configuration of an image pickup apparatus according to the first embodiment of the present invention.

FIG. 2 illustrates a configuration of an image pickup apparatus according to the first embodiment of the present invention. An image pickup apparatus 1 includes an image pickup optical system 2, an image stabilizing lens position detector 3, an image stabilizing lens drive unit 4, a movement detector 5, a CPU 6, a solid-state image pickup element drive unit 7, a solid-state image pickup element 8, an analog signal processor 9, an analog-to-digital (A/D) converter 10, a camera signal processor 11, an image addition processor 12, an image memory 13, a focus lens drive unit 14, a focus lens position detector 15, a zoom lens drive unit 16, a zoom lens position detector 17, a shutter button 18, a memory 19, and a recording/reproducing device 20. For removal of fixed pattern noise, the image pickup apparatus 1 displaces an image-capturing optical axis such that, for example, for each of pixels corresponding to a subject image, the subject image on an image pickup element in the subsequent image capturing is displaced by at least one pixel from that in the previous image capturing.

The image pickup apparatus 1 provides two main image capturing modes, a normal mode in which captured images are recorded in a recording medium of the recording/reproducing device 20 without being added together, and an image addition mode in which captured images are recorded in the recording medium of the recording/reproducing device 20 after being added together. The image addition mode includes a manual image addition mode in which a plurality of images captured when the user presses the shutter button 18 multiple times are added together, and an automatic image addition mode in which a plurality of image automatically and continuously captured when the user presses the shutter button 18 once are added together. Switching between these modes is made by operating an operation unit (not shown) of the image pickup apparatus 1.

The image pickup optical system 2 has an optical axis Z and forms a subject image on the solid-state image pickup element 8. The image pickup optical system 2 includes three lens groups L1, L2, and L3. The lens group L2 in the middle is an image stabilizing lens group configured to be movable in two directions, X and Y directions, orthogonal to each other in a plane orthogonal to the optical axis Z. By moving the lens group L2 in the X and Y directions to decenter the optical axis Z, it is possible to correct movement of an image. Hereinafter, the X direction and the Y direction in the image pickup apparatus 1 are referred to as a pitching direction and a yawing direction, respectively. The lens group L1 adjacent to the subject is a zoom lens group configured to be capable of performing a zooming operation. The lens group L3 adjacent to the solid-state image pickup element 8 is a focus lens group configured to be capable of performing a focusing operation.

The lens group L2 is driven by the image stabilizing lens drive unit 4. The position of the driven lens group L2 is detected by the image stabilizing lens position detector 3. Similarly, the lens group L1 is driven by the zoom lens drive unit 16. The position of the driven lens group L1 is detected by the zoom lens position detector 17. Likewise, the lens group L3 is driven by the focus lens drive unit 14. The position of the driven lens group L3 is detected by the focus lens position detector 15.

The image stabilizing lens drive unit 4 includes a digital-to-analog (D/A) converter 41$y$, a yawing drive unit 42$y$, and a yawing actuator 43$y$ for driving the image stabilizing lens group in the yawing direction. Also, the image stabilizing lens drive unit 4 includes a D/A (digital-to-analog) converter 41$p$, a pitching drive unit 42$p$, and a pitching actuator 43$p$ for driving the image stabilizing lens group in the pitching direction.

The D/A converters 41$y$ and 41$p$ convert digital control signals output by the CPU 6 to analog control signals and supply the analog control signals to the yawing and pitching drive units 42$y$ and 42$p$, respectively. In accordance with the analog control signals supplied from the CPU 6 via the D/A converters 41$y$ and 41$p$, the yawing and pitching drive units 42$y$ and 42$p$ drive and control the lens group L2, via the yawing and pitching actuators 43$y$ and 43$p$, in the yawing and pitching directions, respectively.

The image stabilizing lens position detector 3 includes a position detection Hall element 31$y$ and an A/D converter 32$y$ for detecting the position of the image stabilizing lens group in the yawing direction. Also, the image stabilizing lens position detector 3 includes a position detection Hall element 31$p$ and an A/D converter 32$p$ for detecting the position of the image stabilizing lens group in the pitching direction. In accordance with outputs from the yawing and pitching actuators 43$y$ and 43$p$, the position detection Hall elements 31$y$ and 31$p$ detect the positions of the lens group L2 in the yawing and pitching directions, respectively, and output the detected positions as analog signals. The A/D converters 32$y$ and 32$p$ convert the analog signals supplied from the position detection Hall elements 31$y$ and 31$p$, respectively, to digital signals. Thus, the absolute positions of the image stabilizing lens group in the yawing and pitching directions can be read by the CPU 6.

The movement detector 5 detects movement of the image pickup apparatus 1 caused by, for example, handshake and other vibrations in the yawing and pitching directions, and supplies the result of the detection to the CPU 6. For example, the movement detector 5 includes a yawing angular velocity sensor 51$y$, an analog signal processor 52$y$, and an A/D converter 53$y$ for detecting movement in the yawing direction, and further includes a pitching angular velocity sensor 51$p$, an analog signal processor 52$p$, and an A/D converter 53$p$ for detecting movement in the pitching direction.

The angular velocity sensors 51$y$ and 51$p$ detect movement of the image pickup apparatus 1 including the image pickup optical system 2. With reference to an output obtained when the image pickup apparatus 1 is at rest, the angular velocity sensors 51$y$ and 51$p$ output both positive and negative angular velocity signals in accordance with the direction of movement of the image pickup apparatus 1. The angular velocity sensors 51$y$ and 51$p$ detect movement in the yawing and pitching directions, respectively, and supply the results of the detection as analog signals to the analog signal processors 52$y$ and 52$p$, respectively. The analog signal processors 52$y$ and 52$p$ individually extract handshake information from the analog signals supplied from the angular velocity sensors 51$y$ and 51$p$, and supply the extracted handshake information to the A/D converters 53$y$ and 53$p$, respectively. The A/D converters 53$y$ and 53$p$ convert the analog signals supplied from the analog signal processors 52$y$ and 52$p$, respectively, to digital signals, and supply the digital signals to the CPU 6.

The solid-state image pickup element drive unit 7 drives and controls the solid-state image pickup element 8. The solid-state image pickup element 8 is, for example, a charge-coupled device (CCD) or a complementary metal-oxide semiconductor (CMOS). The solid-state image pickup element 8 is disposed at an end of the optical axis Z. A video image incident through the image pickup optical system 2 is converted by the solid-state image pickup element 8 to an electric signal. A video signal output from the solid-state image pickup element 8 is input to the analog signal processor 9, subjected to analog signal processing such as gamma processing, converted to a digital signal by the A/D converter 10, and subjected to digital signal processing such as noise reduction and edge enhancement. Thus, a luminance signal (Y signal) and a color signal (C signal) can be obtained. Then, the Y/C signals obtained by the camera signal processor 11 are transmitted to the image addition processor 12 disposed downstream of the camera signal processor 11.

In accordance with optical axis displacement information supplied from the CPU 6, the image addition processor 12 corrects the positional relationship between the previously captured image (the first image or an image obtained as a result of the previous addition) and the currently captured image to perform image addition, and stores the resulting image in the image memory 13. Specifically, the image addition processor 12 stores the first captured image without performing image addition. Next, the image addition processor 12 corrects the positional relationship between the first captured image stored in the image memory 13 and the second captured image, adds the first and second captured images together, and stores the resulting image in the image memory 13. Then, the image addition processor 12 corrects the positional relationship between the resulting image stored in the image memory 13 and the third captured image, adds these images together, and stores the resulting image in the image memory 13. In this manner, the image addition is repeated until the image addition processor 12 receives an addition ending flag from the CPU 6.

As described above, since the positional relationship between captured images is corrected before these images are added together, the resulting image obtained as a result of the image addition has an edge portion where not all captured images are superimposed. Hereinafter, a portion where all captured images are superimposed is referred to as an added portion, while a portion where not all captured images are superimposed is referred to as a non-added portion. The image addition processor 12 discards the non-added portion at the edge of the resulting image and supplies only the added portion to the recording/reproducing device 20 via the CPU 6, or supplies the non-added portion as an image having a low signal-to-noise (S/N) ratio to the recording/reproducing device 20 via the CPU 6. When the image addition processor 12 discards the non-added portion at the edge of the image, interpolation or the like may be performed to enlarge or reduce the image to a predetermined size after the discarding is performed. For example, interpolation may be performed such that the image can be scaled to the size of an original image, which is not yet subjected to image addition.

The recording/reproducing device 20 is a device capable of recording and reproducing data in and from a recording medium, such as a memory card, an optical disk, or a magnetic tape. Images supplied from the image addition processor 12 via the CPU 6 are recorded in a recording medium by the recording/reproducing device 20. The memory 19, such as a flash memory, stores an optical axis movement pattern therein. The optical axis movement pattern is a pattern for intentionally displacing the optical axis relative to the solid-state image pickup element 8 at the time of image capturing. The optical axis movement pattern represents the amount of target displacement modulation, that is, the amount by which the optical axis Z is intentionally displaced, for example, in the yawing and pitching directions. Hereinafter, processing for intentionally displacing the optical axis relative to the solid-state image pickup element 8 at the time of image capturing will be referred to as target displacement modulation.

The shutter button 18 is connected to the CPU 6. The shutter button 18 can be pressed halfway or all the way. When the shutter button 18 is pressed halfway or all the way, an output signal corresponding to the button press is output to the CPU 6. On the basis of the output signal from the shutter button 18, the CPU 6 can determine whether the user has pressed the shutter button 18 halfway or all the way.

When the shutter button 18 is pressed, the CPU 6 intentionally displaces the position of the optical axis relative to the solid-state image pickup element 8 from the optical axis center and performs image capturing. For example, if the manual image addition mode is selected as the image capturing mode, every time the shutter button 18 is pressed by the user, the CPU 6 intentionally displaces the optical axis position relative to the solid-state image pickup element 8 from the optical axis center and performs image capturing. If the automatic image addition mode is selected as the image capturing mode, every time the shutter button 18 is pressed by the user and a plurality of images are automatically captured, the CPU 6 intentionally displaces the optical axis position relative to the solid-state image pickup element 8 from the optical axis center. When the automatic image addition mode is selected as the image capturing mode, the CPU 6 displaces the optical axis at the time when an image is read from the solid-state image pickup element 8.

If the captured image is a moving image, the CPU 6 displaces the optical axis Z for each field of the moving image and, at the same time, outputs optical axis displacement information indicating the amount of displacement of the optical axis Z to the image addition processor 12. Also, when the captured image is a moving image, the optical axis Z is intentionally displaced in response to a field synchronizing signal transmitted from the CPU 6 to the solid-state image pickup element drive unit 7, instead of trigger information from the shutter button 18.

The CPU 6 outputs, to the image stabilizing lens drive unit 4, an instruction for intentionally displacing the position of the optical axis Z relative to the solid-state image pickup element 8. For example, if the manual image addition mode is selected as the image capturing mode, the CPU 6 outputs, to the image stabilizing lens drive unit 4, an instruction for displacing the optical axis every time the shutter button 18 is pressed. If the automatic image addition mode is selected as the image capturing mode, the CPU 6 outputs, to the image stabilizing lens drive unit 4, an instruction for displacing the optical axis every time an image is read from the solid-state image pickup element 8. It is preferable that an instruction for displacing the optical axis be output from the CPU 6 to the image stabilizing lens drive unit 4 in such a manner that the instruction is superimposed on an image stabilization waveform.

It is necessary to prevent the optical axis Z from being displaced during exposure. Therefore, if the manual image addition mode is selected as the image capturing mode, the CPU 6 needs to complete the intentional displacement of the optical axis Z to a target position until the shutter button 18 is pressed all the way and exposure starts. Also, if the automatic image addition mode is selected as the image capturing mode, the CPU 6 needs to complete the intentional displacement of the optical axis Z to a target position until an image is read from the solid-state image pickup element 8 and the next image is captured. Unless the image pickup apparatus 1 is determined to be at rest and optical image stabilization is not performed, normal optical image stabilization is performed during exposure.

The CPU 6 captures an image when the shutter button 18 is pressed all the way (when the shutter is released). The CPU 6 detects the position of the optical axis Z at this point, calculates a difference between the optical axis position at the time of the current image capturing and that at the time of the previous image capturing, and transmits the calculated difference as optical axis displacement information to the image addition processor 12. Every time image capturing is performed, the optical axis displacement information is updated and transmitted from the CPU 6 to the image addition processor 12. Upon completion of image addition of a predetermined number of captured images, the resulting image is taken from the image memory 13 via the image addition processor 12 into the CPU 6, subjected to processing such as image compression by the CPU 6, and stored in the recording medium of the recording/reproducing device 20.

The CPU 6 reads an optical axis movement pattern from the memory 19 and controls the image stabilizing lens drive unit 4 in accordance with the optical axis movement pattern. Thus, the CPU 6 causes the optical axis position relative to the solid-state image pickup element 8 to move in accordance with a predetermined pattern. The optical axis Z is moved, for example, in a vertical, horizontal, or oblique direction. The optical axis Z may be moved in a different direction every time image capturing is performed. Thus, by moving the optical axis Z in accordance with the optical axis movement pattern stored in the memory 19, fixed pattern noise can be removed efficiently. The optical axis movement pattern is, for example, calculated on the basis of a result of prior examination of noise caused by the solid-state image pickup element 8, and is stored in the memory 19 during manufacture of the image pickup apparatus 1. If optical axis movement patterns which allow removal of all types of fixed pattern noise are calculated and stored in the memory 19 in advance, excellent removal of fixed pattern noise can be achieved.

Examples of optical axis movement patterns for intentionally displacing the optical axis Z include an optical axis movement pattern for moving the optical axis Z in an oblique direction relative to the optical axis center, an optical axis movement pattern for moving the optical axis Z such that dead pixels do not overlap with one another after image addition, an optical axis movement pattern for moving the optical axis Z such that vertical and horizontal stripes of fixed pattern noise are not superimposed on one another after image addition, an optical axis movement pattern for moving the optical axis Z about a reference pixel, and an optical axis movement pattern for moving the optical axis Z in vertical and horizontal directions (pitching and yawing directions) by a predetermined amount. It is preferable that an appropriate optical axis movement pattern is selected from those described above depending on the type of noise that appears. For example, if fixed pattern noise appears in vertical and horizontal directions, it is preferable to use the optical axis movement pattern for moving the optical axis Z in an oblique direction relative to the optical axis center. If a plurality of dead pixels are present, it is preferable to use the optical axis movement pattern for moving the optical axis Z such that the dead pixels do not overlap with one another after image addition. If a plurality of vertical and horizontal stripes of fixed pattern noise are present, it is preferable to use the optical axis movement pattern for moving the optical axis Z such that the vertical and horizontal stripes of fixed pattern noise are not superimposed on one another after image addition. The optical axis movement patterns described above may be used in combination.

Figure 3:
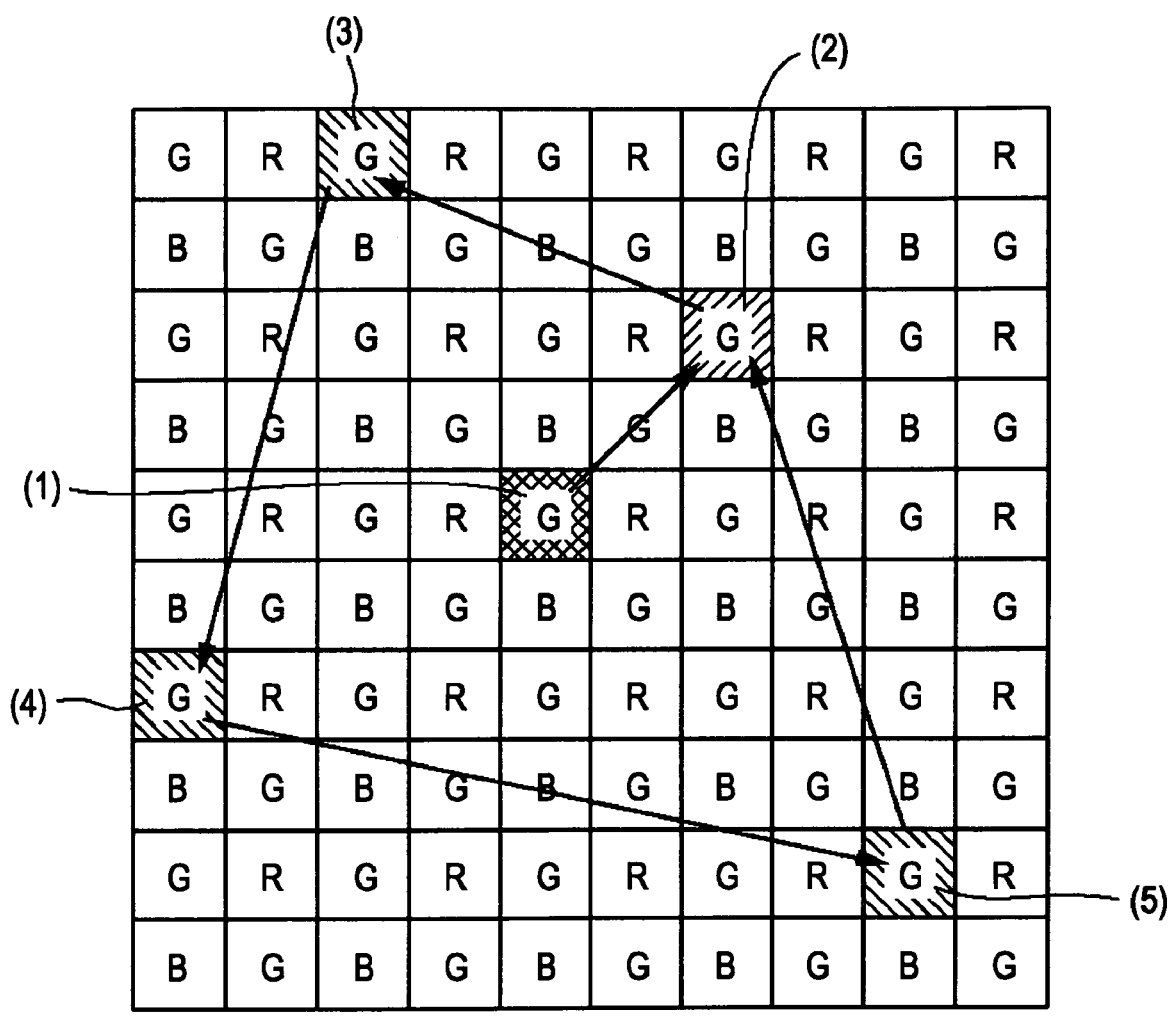
FIG. 3 illustrates a pattern of movement of an optical axis during image capturing.

FIG. 3 illustrates a pattern of movement of the optical axis Z relative to the solid-state image pickup element 8 during image capturing. In FIG. 3, the pixel arrangement of the solid-state image pickup element 8 is based on a two-by-two matrix of RGB pixels. However, the pixel arrangement of the solid-state image pickup element 8 is not limited to this. In FIG. 3, G pixel (1) corresponds to a position at which the optical axis Z is located when the first image is captured. The optical axis Z is moved about G pixel (1) from one position to another, at each of which an image is captured. For example, the optical axis Z is moved about G pixel (1) in the order of G pixel (1), G pixel (2), G pixel (3), G pixel (4), G pixel (5), G pixel (2), G pixel (3), G pixel (4), G pixel (5), and so on, and an image is captured at each of optical axis positions corresponding to these pixels. Then, by adding the images captured while moving the optical axis Z as described above, it is possible to reduce fixed pattern noise.

FIG. 3 illustrates the case where the optical axis Z is moved by using G pixel as a target. However, a pixel used as a target is not limited to G pixel, and R pixel or B pixel may be used as a target. Alternatively, the optical axis Z may be moved by using at least two of R pixel, G pixel, and B pixel as targets. For example, when two types of pixels, R pixel and B pixel, are used as targets, the optical axis Z is moved in the order of R pixel, B pixel, R pixel, and so on. A movement pattern used for capturing a moving image may be the same as that used for capturing still images. However, since a moving image is obtained by temporally integrating images captured over a long period of time, a better effect is achieved by assigning target coordinates on a smaller scale basis, such as on a single pixel basis.

The CPU 6 counts the number of captured images (the number of image additions performed). When the number of captured images reaches a value set by the user of the image pickup apparatus 1 or a value set as a default value in advance, the CPU 6 outputs an addition ending flag to the image addition processor 12. When the addition ending flag is received by the image addition processor 12, the image addition ends.

Figure 4:
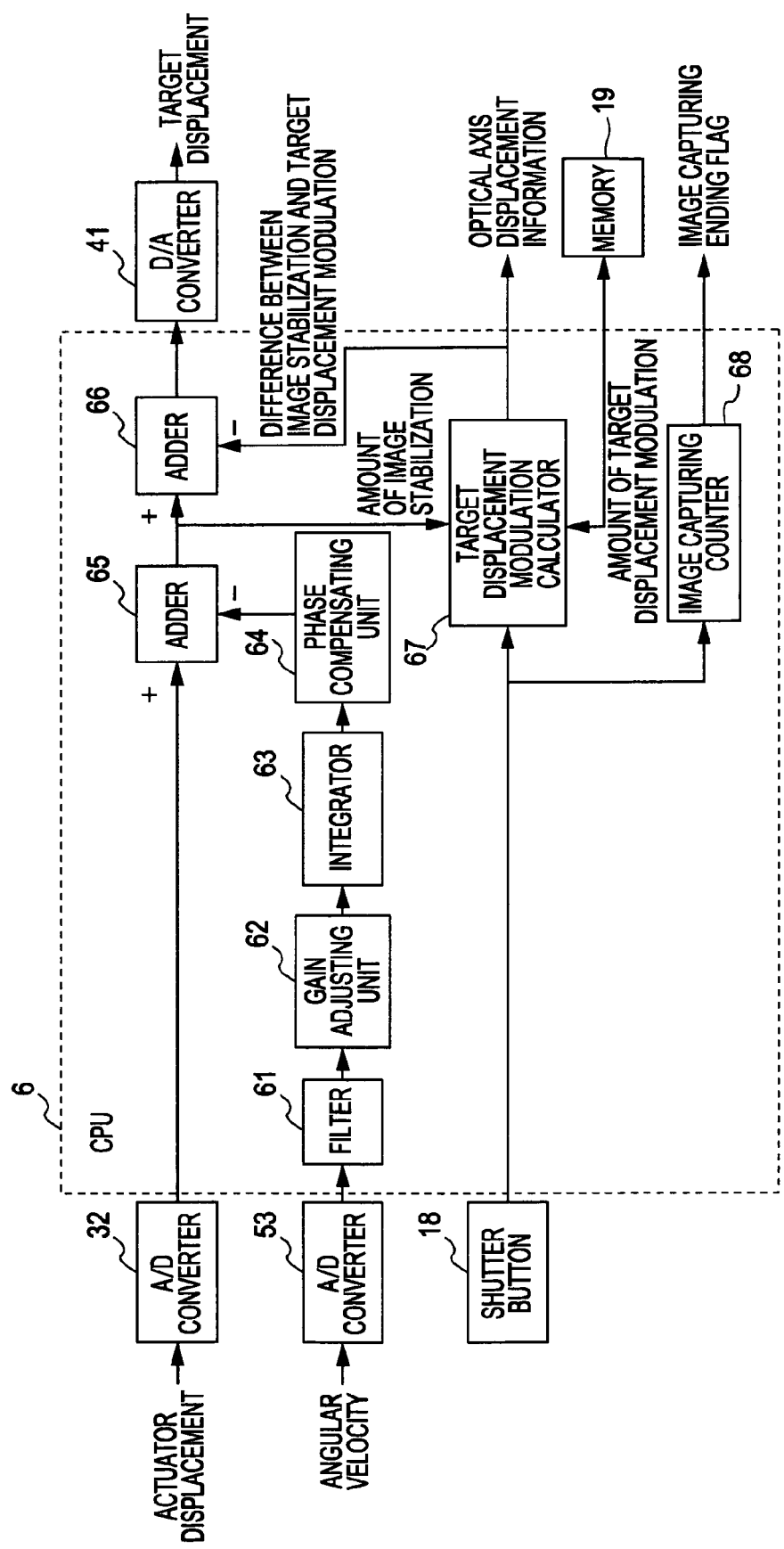
FIG. 4 is a block diagram illustrating a first example of internal processing of a central processing unit (CPU) during image capturing.

FIG. 4 illustrates a first example of internal processing of the CPU 6 during image capturing. This internal processing is performed when still images are captured in the manual image addition mode. A coefficient used in each block of this internal processing is present in a program as a fixed parameter or stored in the memory 19 in a rewritable manner.

The CPU 6 includes a filter 61, a gain adjusting unit 62, an integrator 63, a phase compensating unit 64, adders 65 and 66, a target displacement modulation calculator 67, and an image capturing counter 68. Since internal processing of the CPU 6 is performed in the same manner for both the yawing and pitching directions, the following description will be made without distinction therebetween.

Actuator displacement output from the position detection Hall element 31 as an analog signal is converted to a digital signal by the A/D converter 32 and input to the adder 65. At the same time, an angular velocity output from the angular velocity sensor 51 as an analog signal is converted to a digital signal by the A/D converter 53 and input to the filter 61. The digital signal input to the filter 61 is subjected to predetermined filter processing by the filter 61, gain-adjusted by the gain adjusting unit 62, integrated by the integrator 63, phase-compensated by the phase compensating unit 64, and input to the adder 65.

The adder 65 performs addition (negative addition) of the digital signal output from the phase compensating unit 64 and the digital signal output from the A/D converter 32, and supplies the result of the addition (the amount of image stabilization) to the adder 66. If the processing does not involve intentional displacement of the optical axis Z and involves normal image stabilization only, control is performed such that the output from the adder 65 is transmitted to the D/A converter 41 as the amount of image stabilization performed during image capturing. However, when the processing involves intentional displacement of the optical axis Z as described above, control is performed such that the output from the adder 65 is further transmitted to the adder 66 disposed downstream of the adder 65.

When trigger information is supplied from the shutter button 18, the target displacement modulation calculator 67 calculates a difference between the amount of normal image stabilization output from the adder 65 and the amount of target displacement modulation read from the memory 19.

Here, the amount of target displacement modulation is the amount of displacement for intentionally displacing the optical axis position relative to the solid-state image pickup element 8 from the optical axis center at the time of image capturing. The target displacement modulation calculator 67 outputs the calculated difference to the adder 66 and also outputs it as optical axis displacement information to the image addition processor 12.

The adder 66 performs addition (negative addition) of the amount of image stabilization supplied from the adder 65 and the above-described difference between the amount of image stabilization and the amount of target displacement modulation supplied from the target displacement modulation calculator 67 to calculate the amount of target displacement, and supplies the calculated amount as a digital signal to the D/A converter 41. The D/A converter 41 converts the digital signal supplied from the adder 66 to an analog signal and outputs the analog signal to the drive unit 42. The image capturing counter 68 counts the number of captured images in accordance with trigger information from the shutter button 18. When the predetermined number of captured images is reached, the image capturing counter 68 outputs an image capturing ending flag to the image addition processor 12.

Figure 5:
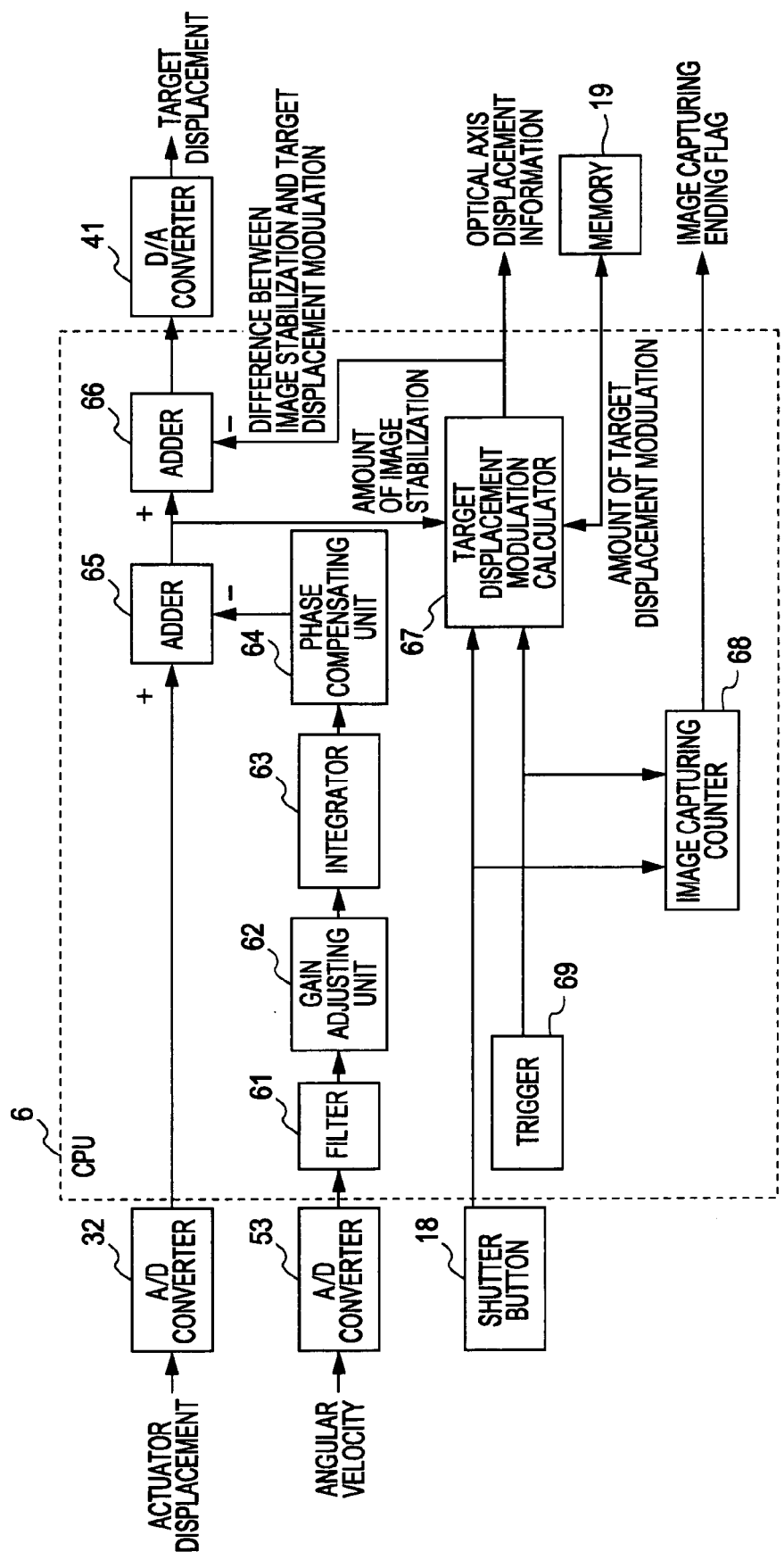
FIG. 5 is a block diagram illustrating a second example of internal processing of the CPU during image capturing.

FIG. 5 illustrates a second example of internal processing of the CPU 6 during image capturing. This internal processing is performed when moving or still images are captured. During still image capturing, the target displacement modulation calculator 67 calculates the amount of target displacement for image stabilization in response to a trigger, that is, a press of the shutter button 18. During moving image capturing, the target displacement modulation calculator 67 calculates the amount of target displacement for image stabilization in response to a trigger 69, that is, reading of image data from the solid-state image pickup element 8. The image capturing counter 68 counts the number of times the shutter button 18 has been pressed or the number of times an image has been read from the solid-state image pickup element 8. Then, when the predetermined number of captured images is reached, the image capturing counter 68 outputs an image capturing ending flag to the image addition processor 12.

Figure 6:
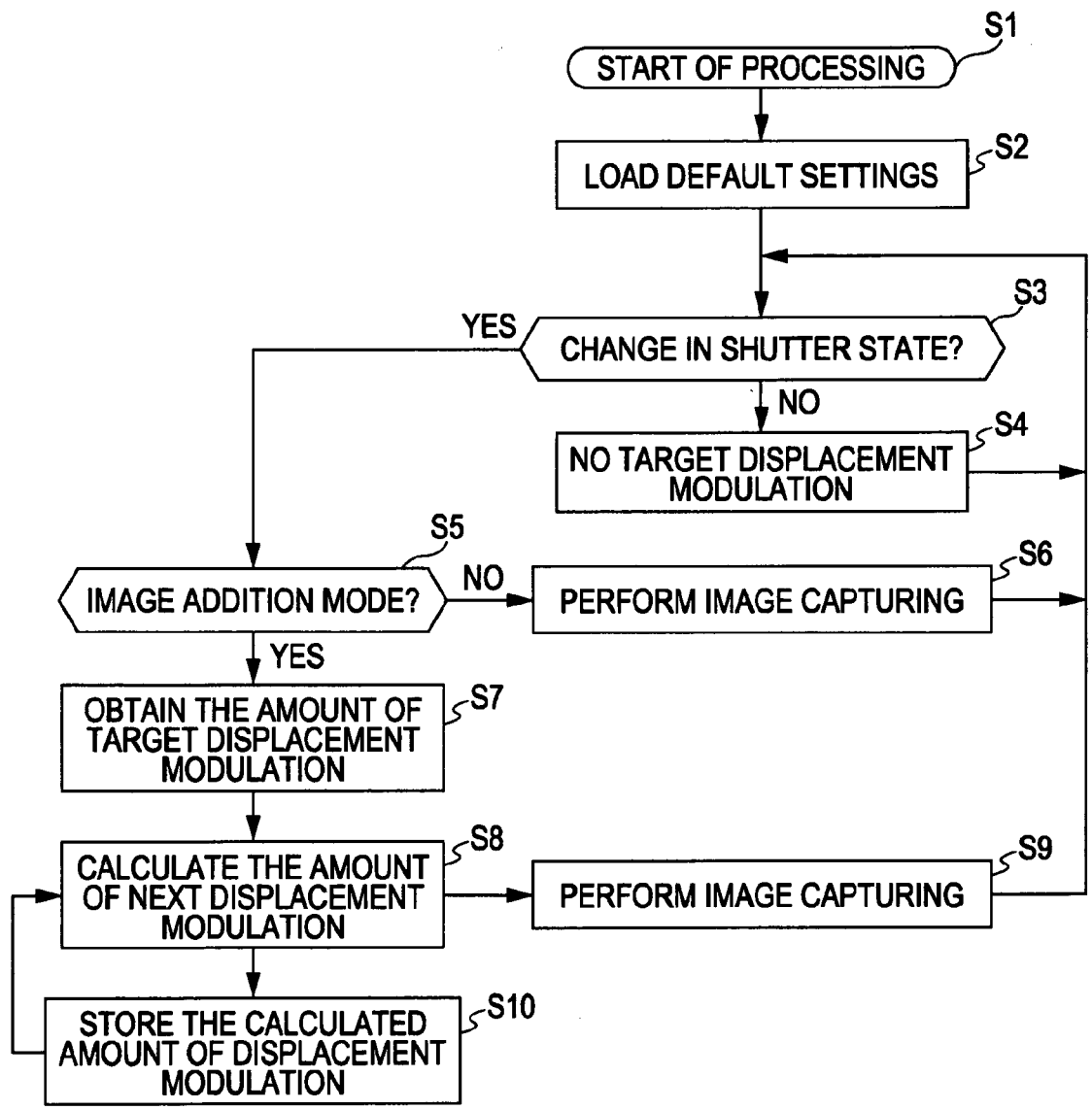
FIG. 6 is a flowchart illustrating an operation of the CPU during image capturing.

FIG. 6 is a flowchart illustrating an example of operation of the CPU 6 during image capturing.

When the power is turned on in step S1, the CPU 6 loads default settings from a program or the memory 19 to set the default settings in step S2. In step S3, the CPU 6 waits for a press of the shutter button 18 while performing normal image stabilization.

If it is determined in step S3 that the shutter button 18 has not been pressed, the processing proceeds to step S4, where the CPU 6 repeats the normal image stabilization. If it is determined in step S3 that the shutter button 18 has been pressed, the processing proceeds to step S5, where the CPU 6 further determines whether target displacement modulation is to be performed, that is, whether the image addition mode is selected as the image capturing mode.

If it is determined in step S5 that the image addition mode is not selected as the image capturing mode, the processing proceeds to step S6, where the CPU 6 captures an image without performing the target displacement modulation. After the image is captured, the processing returns to step S3.

If it is determined in step S5 that the image addition mode is selected as the image capturing mode, the processing proceeds to step S7, where the CPU 6 obtains the amount of target displacement modulation from the memory 19. In step S8, on the basis of the amount of target displacement modulation obtained in step S7 and displacement information for the previous image capturing, the CPU 6 calculates the amount of next displacement modulation. In step S9, on the basis of the amount of displacement modulation calculated in step S8, the CPU 6 intentionally displaces the position of the optical axis Z relative to the solid-state image pickup element 8 and captures an image. Then, after the image is captured, the processing returns to step S3. In step S10, the CPU 6 stores in the memory 19 the amount of displacement modulation calculated in step S8.

If the image captured in the above-described operation of the CPU 6 is a moving image, image reading from the solid-state image pickup element 8, instead of a press of the shutter button 18, may be used as a trigger for the target displacement modulation.

In the first embodiment described above, the optical axis Z is displaced every time image capturing is performed, the displacement between captured images is corrected, and the resulting images are added together. Therefore, fixed pattern noise can be reduced even under conditions where optical image stabilization is effective or no image blur caused by handshake occurs. After the shutter button 18 is pressed once for still image capturing, when a predetermined number of images are automatically and continuously captured and added together to remove fixed pattern noise, the user can remove fixed pattern noise without regard to the operation of continuous image capturing and image addition.

Second Embodiment

Figure 7:
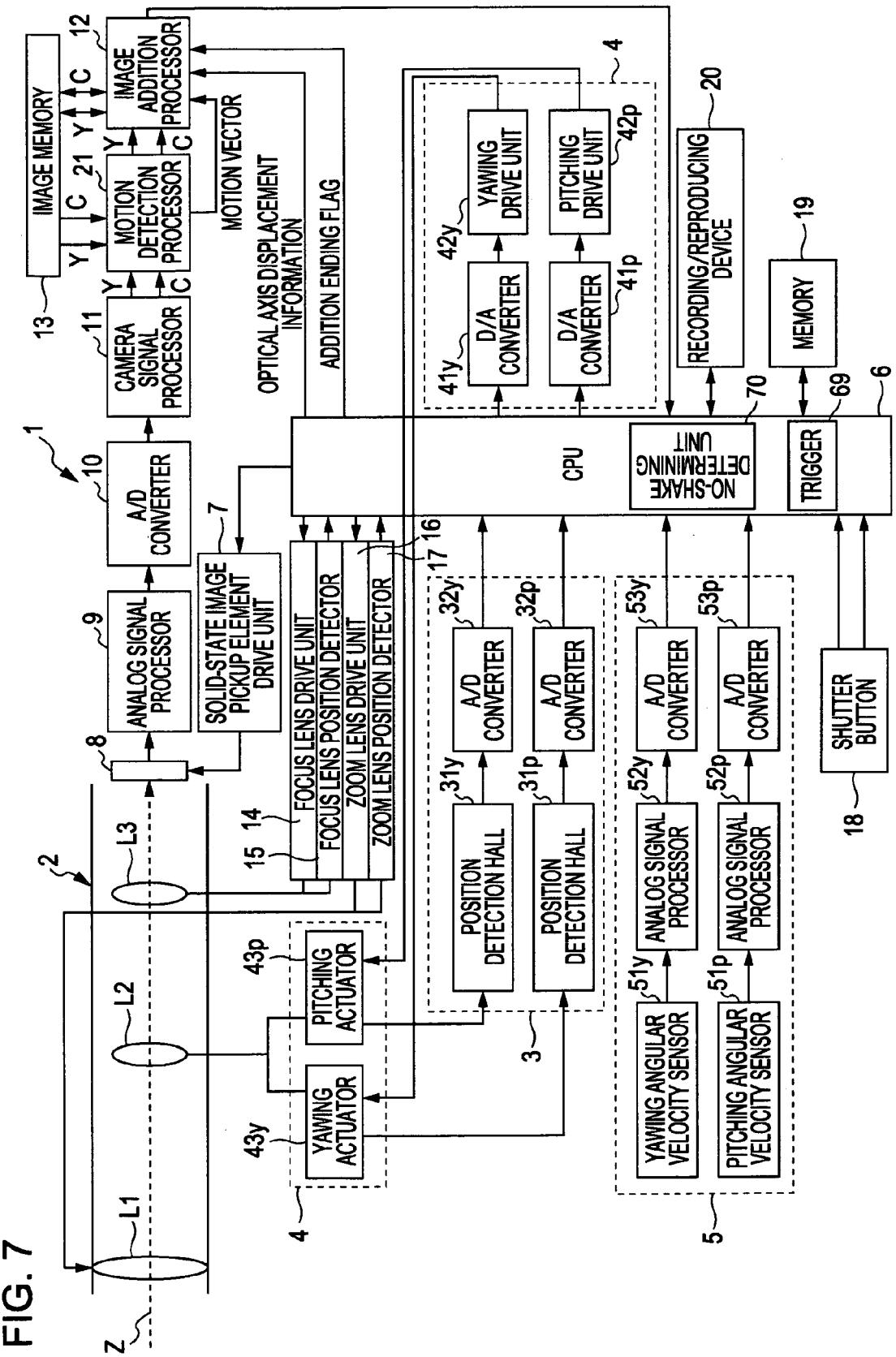
FIG. 7 is a block diagram illustrating a configuration of an image pickup apparatus according to a second embodiment of the present invention.

FIG. 7 illustrates a configuration of an image pickup apparatus according to a second embodiment of the present invention. The image pickup apparatus 1 of the second embodiment is configured to correct positional displacement between images on the basis of a motion vector.

A motion detection processor 21 compares the previously captured image (the first image or an image obtained as a result of the previous addition) stored in the image memory 13 with the currently captured image transmitted from the camera signal processor 11 to detect a motion vector, and supplies the detected motion vector to the image addition processor 12. On the basis of the motion vector supplied from the motion detection processor 21, the image addition processor 12 corrects positional displacement between the previously captured image read from the image memory 13 and the currently captured image supplied from the motion detection processor 21 and adds these images together. The correction of positional displacement between these images is made, for example, by shifting the entire previously or currently captured image on the basis of the motion vector. An image obtained by addition of these images is stored in the image memory 13.

For the rest, the second embodiment is the same as the first embodiment and further description thereof will be omitted.

In the second embodiment described above, after the entire captured image is shifted on the basis of a motion vector, the previously and currently captured images are added together. Thus, the S/N ratio of both moving and still images can be improved.

Third Embodiment

In a third embodiment of the present invention, local motion vectors of individual objects within a screen are detected, an image is shifted with respect to each local vector, and thus positional displacement between images is corrected. An image pickup apparatus of the third embodiment is the same as that of the second embodiment except for the configuration and operation of the motion detection processor and image addition processor. Therefore, the image pickup apparatus of the third embodiment will be described with reference to FIG. 7 using the same reference numerals as those for the second embodiment.

The motion detection processor 21 compares the previously captured image (the first image or an image obtained as a result of the previous addition) stored in the image memory 13 with the currently captured image transmitted from the camera signal processor 11 to detect local motion vectors of individual objects within a screen, and supplies the detected local vectors to the image addition processor 12. On the basis of the local vectors supplied from the motion detection processor 21, the image addition processor 12 shifts an image with respect to each local vector to correct positional displacement between images. An image obtained by addition of these images is stored in the image memory 13.

In the third embodiment described above, local motion vectors of individual objects within a screen are detected, an image is shifted with respect to each local vector, and the resulting images are added together. Thus, the S/N ratio of both moving and still images can be improved. Particularly for a moving image, even when there is a moving object within an image, it is possible to obtain an image having a high S/N ratio and free from image lag.

Fourth Embodiment

An image pickup apparatus of a fourth embodiment of the present invention determines whether there is a shake (camera shake) of the image pickup apparatus. Then, only when there is no shake, the image pickup apparatus intentionally displaces the optical axis Z every time image capturing is performed. The image pickup apparatus of the fourth embodiment is the same as that of the second embodiment except for the configuration and operation of the CPU 6.

Figure 8:
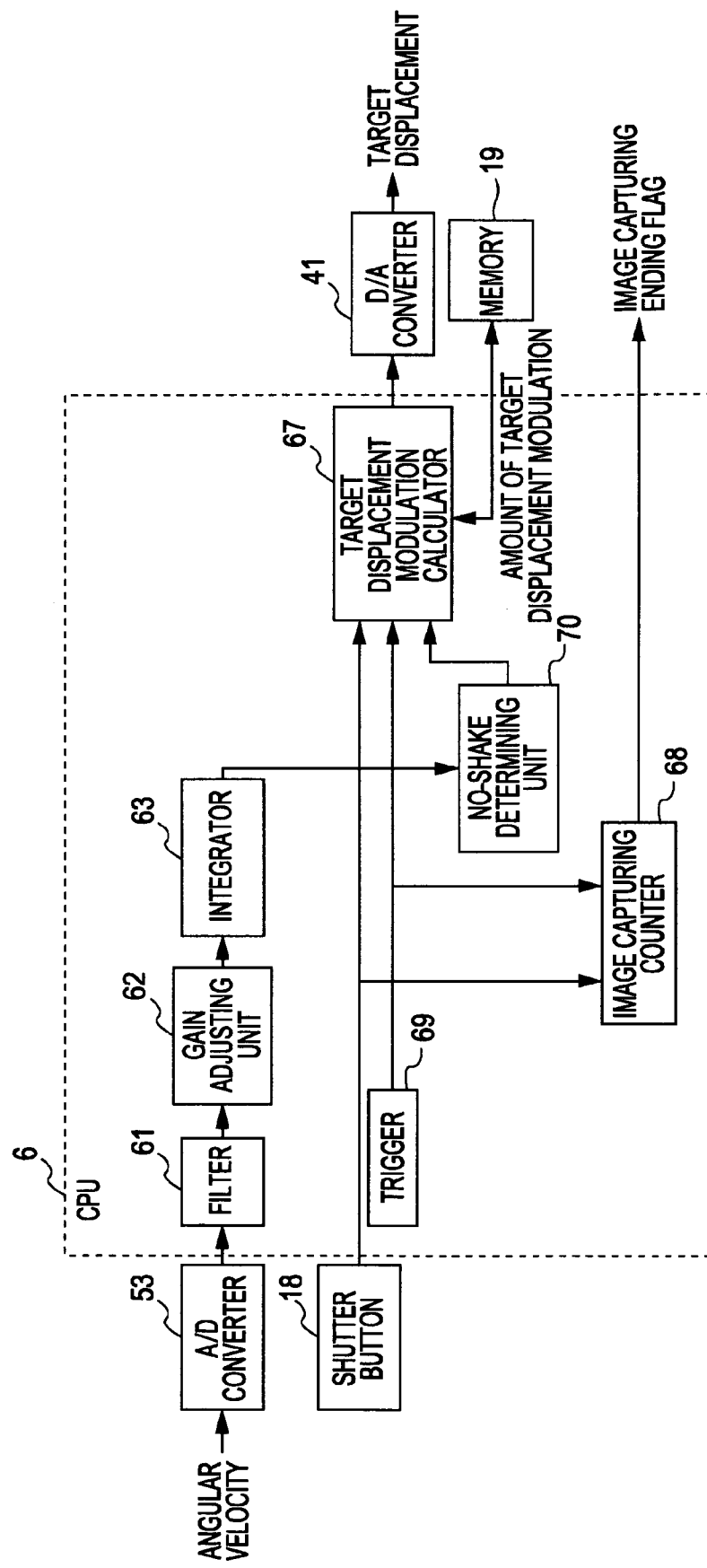
FIG. 8 is a block diagram illustrating an example of internal processing of the CPU in an image pickup apparatus according to a fourth embodiment of the present invention.

FIG. 8 illustrates an example of internal processing of the CPU 6 during image capturing. The CPU 6 of the fourth embodiment differs from that of the second embodiment in that the CPU 6 of the fourth embodiment further includes a no-shake determining unit 70 and that the target displacement modulation calculator 67 operates in accordance with the determination of the no-shake determining unit 70.

On the basis of a signal supplied from the A/D converter 53 through each processing unit, the no-shake determining unit 70 determines whether there is a shake of the image pickup apparatus 1 and supplies a result of the determination to the target displacement modulation calculator 67. If the target displacement modulation calculator 67 receives a result indicating that there is no shake (e.g., no image blur caused by handshake occurs), the target displacement modulation calculator 67 reads the amount of target displacement modulation from the memory 19 and supplies the read value to the D/A converter 41.

In the fourth embodiment described above, only when there is no shake of the image pickup apparatus 1, the optical axis position relative to the solid-state image pickup element 8 is intentionally displaced every time image capturing is performed. This makes it possible to reduce system power consumption.

Fifth Embodiment

Figure 9:
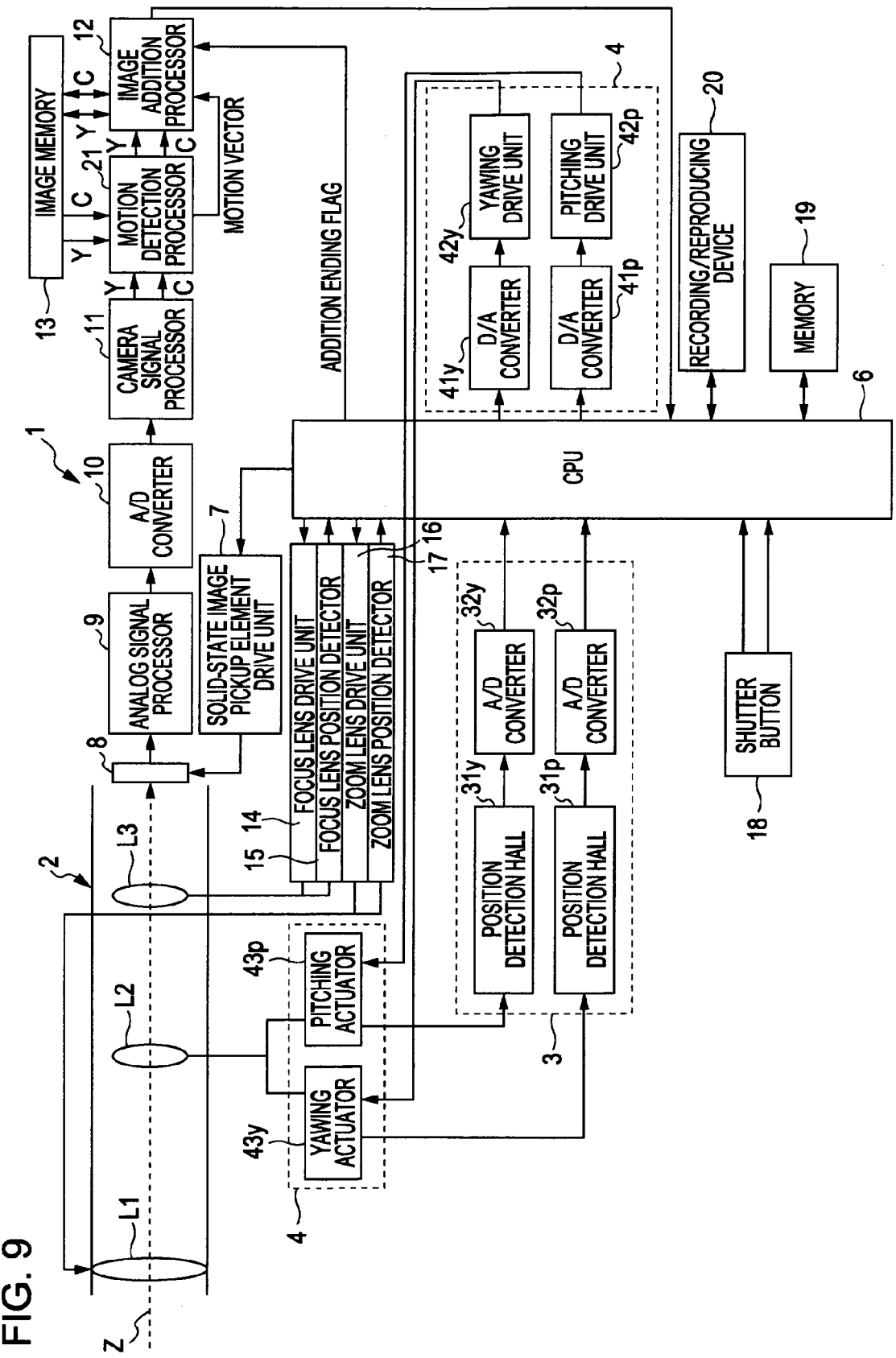
FIG. 9 is a block diagram illustrating a configuration of an image pickup apparatus according to a fifth embodiment of the present invention.

FIG. 9 illustrates a configuration of an image pickup apparatus according to a fifth embodiment of the present invention. For example, every time the shutter button 18 is pressed or every time an image is read from the solid-state image pickup element 8, the CPU 6 reads the amount of target displacement modulation from the memory 19 and outputs the read value to the image stabilizing lens drive unit 4. On the basis of the amount of target displacement modulation output from the CPU 6, the image stabilizing lens drive unit 4 drives the lens group L2 in the yawing and pitching directions.

Figure 10:
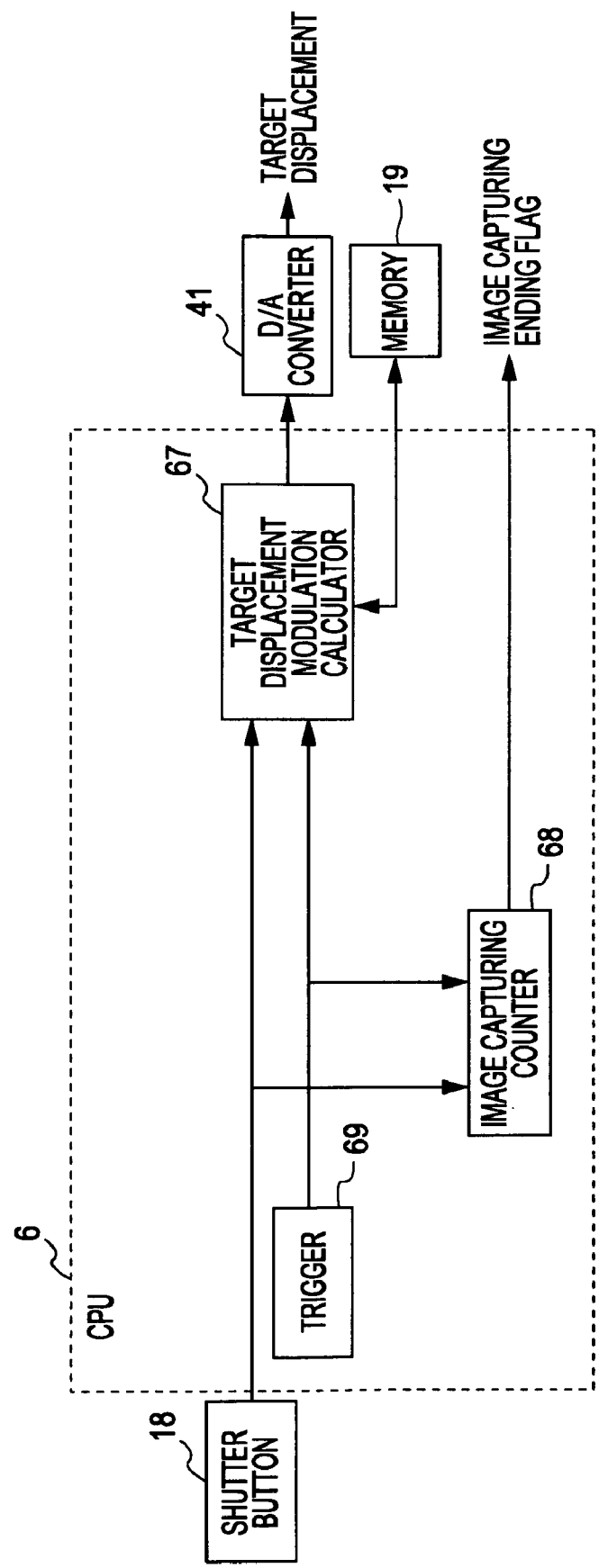
FIG. 10 is a block diagram illustrating an example of internal processing of the CPU in the image pickup apparatus according to the fifth embodiment of the present invention.
Figure 11:
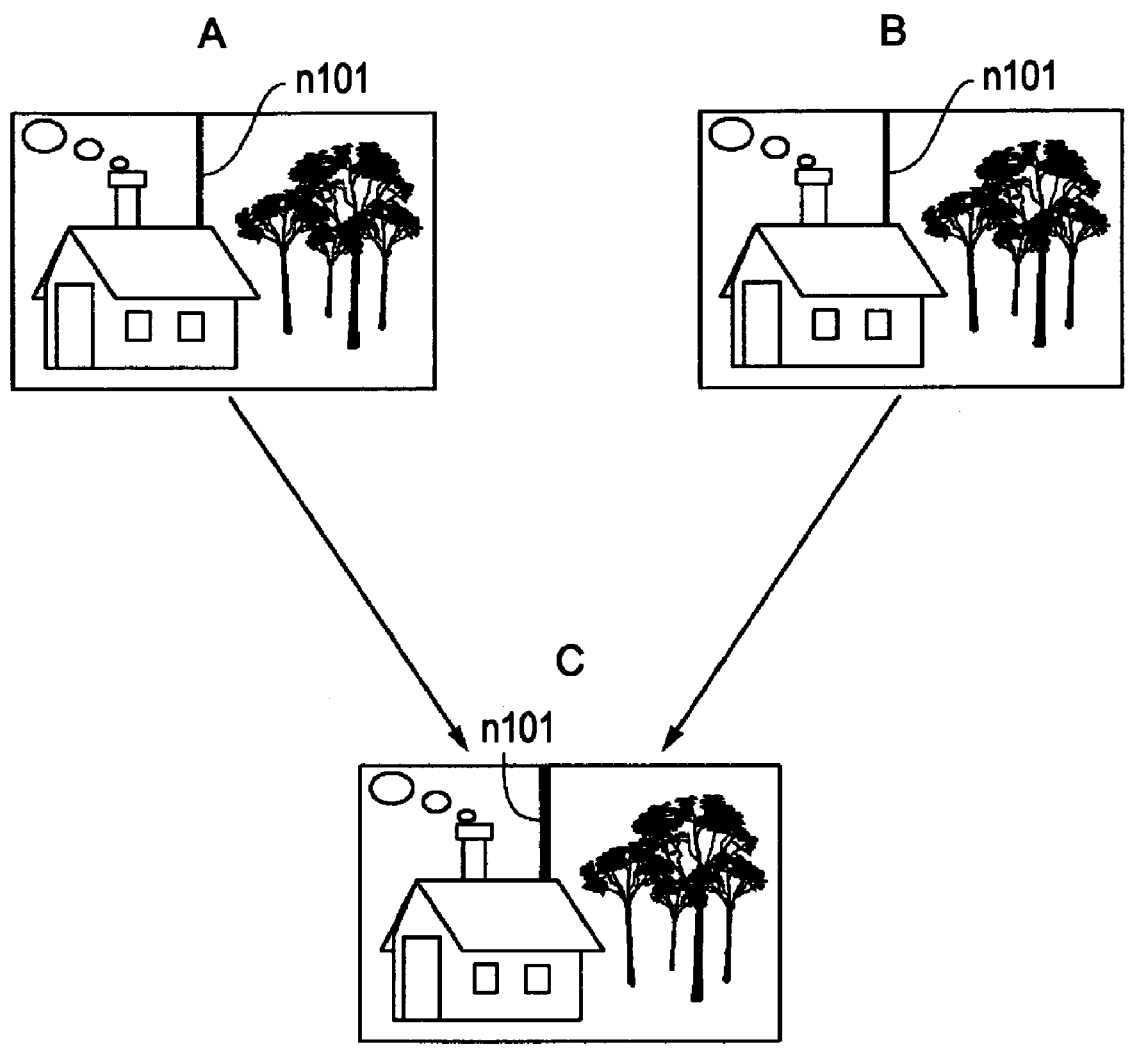
FIG. 11 is a diagram for illustrating an operation of an image processing apparatus of the related art.

FIG. 10 illustrates an example of internal processing of the CPU 6. The target displacement modulation calculator 67 reads the amount of target displacement modulation from the shutter button 18 by using a press of the shutter button 18 or reading of an image from the solid-state image pickup element 8 as a trigger, and outputs the read value to the D/A converter 41.

For the rest, the fifth embodiment is the same as the second embodiment and further description thereof will be omitted.

In the fifth embodiment described above, the movement detector 5 of the second embodiment can be omitted and thus, the configuration of the image pickup apparatus 1 can be simplified.

Although the first to fifth embodiments of the present invention have been described in detail, the present invention is not limited to the embodiments described above. Various modifications can be made on the basis of the technical idea of the present invention.

For example, the configurations of the first to fifth embodiments can be combined without departing from the scope of the present invention.

In the first to fifth embodiments described above, the present invention is applied to the image pickup apparatuses having an optical image stabilizing mechanism. Additionally, the present invention is applicable to image pickup apparatuses of image sensor shift type.

In the first to fifth embodiments described above, image addition is performed on Y/C signals. Alternatively, the same processing may be performed on direct data (RAW data) read from the solid-state image pickup element or an RGB surface (half-processed data) inside the camera signal processor.

In the first to fifth embodiments described above, an optical axis movement pattern is stored in the memory 19 in advance. Alternatively, fixed pattern noise may be detected at power-on or at the time of battery replacement, and a pattern for removing the fixed pattern noise may be calculated by the CPU 6 and stored in the memory 19. Specifically, the CPU 6 further includes a detector for detecting noise in the solid-state image pickup element 8, calculates an optical axis movement pattern for reducing noise detected by the detector, and stores a result of the calculation in the memory 19. At the time of image capturing, the CPU 6 reads the optical axis movement pattern from the memory 19. Then, on the basis of the optical axis movement pattern read from the memory 19, the CPU 6 displaces the optical axis position relative to the solid-state image pickup element 8 every time image capturing is performed. With this configuration, fixed pattern noise that occurs after manufacturing of the image pickup apparatus can also be reduced. That is, a more effective reduction of fixed pattern noise can be achieved.

In the first to fifth embodiments described above, the present invention is applied to the image pickup apparatuses that perform normal exposure image capturing. Additionally, the present invention is applicable to image pickup apparatuses that perform long-time exposure image capturing. When the present invention is applied to an image pickup apparatus that performs long-time exposure image capturing, exposure time is intentionally divided into segments (e.g., one-second image capturing is divided into four 0.25-second exposure periods), the optical axis Z is intentionally displaced every time an image captured by fractionated exposure is read, positional displacement between a plurality of images obtained by fractionated exposure is corrected, and the resulting images are added together. Thus, it is possible to reduce fixed pattern noise in the image pickup element generated during long-time exposure image capturing.

In the second and third embodiments described above, the image addition processor 12 may determine the amount of image stabilization remaining incomplete (residual image stabilization) on the basis of a difference between a result of motion vector detection and optical axis displacement information, and correct an image on the basis of the amount of image stabilization remaining incomplete. Thus, the performance of image stabilization can be further improved.

When a moving image is processed in the first to fifth embodiments described above, circulating addition filter processing may be performed. That is, instead of entirely (×1) adding the previously captured image to the next image, the previously captured image may be multiplied by an attenuation coefficient (e.g., 1/64) and added to the next image. At the same time, target displacement during exposure of each field may be varied for each image and added by the image addition processor 12. With this configuration, it is possible to reduce moving image lag and fixed pattern noise.

In the first to fifth embodiments described above, addition of two images is repeated to reduce fixed pattern noise. Alternatively, all captured images may be stored in the image memory 13 and added together after completion of image capturing. In this case, optical axis displacement information is stored in the image memory 13. Then, at the time of addition of all images, the optical axis displacement information stored in the image memory 13 is used to correct positional displacement between images.

In the first to fifth embodiments described above, images are added by the image addition processor 12 and stored in the image memory 13. Alternatively, an averaging processor may be added downstream of the image addition processor 12, and an image resulting from addition of images may be averaged by the averaging processor and stored in the image memory 13.

In the second and third embodiments described above, if optical image stabilization is not performed by an instructed amount or if the amount of image frame displacement exceeds the amount of optical image stabilization (if there is image stabilization remaining incomplete), only a result of motion vector detection may be used or both a result of motion vector detection and optical axis displacement information may be used. Thus, more accurate image addition can be achieved.

In the first to fifth embodiments described above, the optical axis position relative to the solid-state image pickup element 8 is displaced in accordance with a predetermined pattern. Alternatively, the optical axis position relative to the solid-state image pickup element 8 may be randomly displaced. For example, the CPU 6 may further include a random number generator generating random numbers. Then, the target displacement modulation calculator 67 may calculate a difference between the amount of normal image stabilization and the amount of target displacement modulation using random numbers generated by the random number generator, instead of using the amount of target displacement modulation read from the memory 19. With this configuration, the position of fixed pattern noise can be displaced randomly for each image and thus, fixed pattern noise can be reduced.

In the first to fifth embodiments described above, an optical axis movement pattern is stored in the memory 19. Alternatively, an optical axis movement pattern may be included in a program.

In the first to fifth embodiments described above, the number of captured images is counted and image addition is repeated until the predetermined number of captured images is reached. Alternatively, while the shutter button 18 continues to be pressed, images may be continuously captured and addition of images captured during this period may be repeated. With this configuration, if the user appropriately adjusts the period of time during which the shutter button 18 is pressed, the number of images to be added can be set easily and intuitively.

It should be understood by those skilled in the art that various modifications, combinations, sub-combinations and alterations may occur depending on design requirements and other factors insofar as they are within the scope of the appended claims or the equivalents thereof.

What is claimed is:

1. An image pickup apparatus comprising:
   an image pickup optical system having an optical axis and configured to form a subject image;
   an image pickup element configured to pick up the subject image and output the picked-up subject image as an image;
   an image addition processor configured to correct positional displacement between a plurality of images output from the image pickup element each image having fixed pattern noise and only after the positional displacement therebetween is corrected so as to change a position of the fixed pattern noise therein to add the resulting images together such that the image addition processor corrects the respective positional displacement between a first image which was previously captured and a second image which is currently captured before adding the first image and the second image together, so that the fixed pattern noise appears at different positions in a resulting added image so as to reduce a level of the fixed pattern noise; and
   an operation unit.

2. The image pickup apparatus according to claim 1, further comprising an optical axis controller configured to displace an optical axis position relative to the image pickup element every time image capturing is performed; and
   wherein the image output from the image pickup element is a moving image; and
   the optical axis controller displaces an optical axis position relative to the image pickup element every time a frame of the moving image is captured.

3. The image pickup apparatus according to claim 1, further comprising an optical axis controller configured to displace an optical axis position relative to the image pickup element every time image capturing is performed; and
   wherein the optical axis controller includes:
   a calculating unit configured to calculate the amount of displacement of the optical axis position relative to the image pickup element, and
   a drive unit configured to displace, on the basis of the amount of displacement calculated by the calculating unit, the optical axis position relative to the image pickup element every time image capturing is performed; and
   the image addition processor corrects positional displacement between the plurality of images on the basis of the amount of displacement calculated by the calculating unit.

4. The image pickup apparatus according to claim 3, wherein the calculating unit calculates the amount of shake of the image pickup apparatus and calculates the amount of displacement of the optical axis position relative to the image pickup element, the amount of displacement including the amount of shake of the image pickup apparatus.

5. The image pickup apparatus according to claim 3, wherein the calculating unit outputs an instruction for displacing the optical axis in such a matter that the instruction is superimposed on a normal image stabilization waveform.

6. The image pickup apparatus according to claim 1, further comprising an optical axis controller configured to displace an optical axis position relative to the image pickup element every time image capturing is performed; and wherein the optical axis controller includes a shake determining unit configured to determine whether the image pickup apparatus is at rest; and
only when the shake determining unit determines that the image pickup apparatus is at rest, the optical axis controller displaces the optical axis position relative to the image pickup element every time image capturing is performed.

7. The image pickup apparatus according to claim 1, further comprising an optical axis controller configured to displace an optical axis position relative to the image pickup element every time image capturing is performed; and wherein the optical axis controller sets the amount of displacement of the optical axis position relative to the image pickup element when reading an image from the image pickup element.

8. The image pickup apparatus according to claim 1, further comprising an optical axis controller configured to displace an optical axis position relative to the image pickup element every time image capturing is performed; and wherein the optical axis controller displaces the optical axis position relative to the image pickup element randomly or in accordance with a predetermined pattern, every time image capturing is performed.

9. The image pickup apparatus according to claim 1, further comprising an optical axis controller configured to displace an optical axis position relative to the image pickup element every time image capturing is performed; and wherein the optical axis controller displaces the optical axis position relative to the image pickup element in a vertical direction, a horizontal direction, or an oblique direction, every time image capturing is performed.

10. The image pickup apparatus according to claim 1, further comprising a storage unit configured to store an optical axis movement pattern, and further comprising an optical axis controlled configured to displace an optical axis position relative to the image pickup element every time image capturing is performed,
wherein, in accordance with the optical axis movement pattern stored in the storage unit, the optical axis controller displaces the optical axis position relative to the image pickup element.

11. The image pickup apparatus according to claim 1, further comprising a motion vector detection processor configured to detect a motion vector by comparing a current image and a previous image output from the image pickup element,
wherein the image addition processor corrects positional displacement between the plurality of images on the basis of the motion vector detected by the motion vector detection processor.

12. The image pickup apparatus according to claim 1, further comprising an optical axis controller configured to displace an optical axis position relative to the image pickup element every time image capturing is performed; and wherein, for long-time exposure image capturing, the image pickup element captures a plurality of images during a single period of long-time exposure;
the optical axis controller displaces the optical axis position relative to the image pickup element every time an image is captured during the single period of long-time exposure; and
the image addition processor corrects positional displacement between the plurality of images captured during the single period of long-time exposure and adds the resulting images together.

13. The image pickup apparatus according to claim 1, wherein the image pickup element captures a plurality of images automatically and continuously in response to a single instruction for image capturing, the instruction being input from the operation unit; and
the image addition processor corrects positional displacement between the plurality of the images continuously captured by the image pickup element and adds the resulting images together.

14. An image pickup apparatus comprising:
an image pickup optical system having an optical axis and configured to form a subject image;
an image pickup element configured to pick up the subject image and output the picked-up subject image as an image;
an optical axis controller configured to displace an optical axis position relative to the image pickup element every time image capturing is performed;
an image addition processor configured to correct positional displacement between a plurality of images output from the image pickup element and add the resulting images together; and
an operation unit,
wherein, when the image pickup element has at least one of vertical noise and horizontal noise, the optical axis controller displaces the optical axis position relative to the image pickup element in an oblique direction.

15. An image pickup apparatus comprising:
an image pickup optical system having an optical axis and configured to form a subject image;
an image pickup element configured to pick up the subject image and output the picked-up subject image as an image;
an optical axis controller configured to displace an optical axis position relative to the image pickup element every time image capturing is performed;
an image addition processor configured to correct positional displacement between a plurality of image output from the image pickup element and add the resulting image together; and
an operation unit,
wherein, when the image pickup element has a dead pixel, the optical axis controller displaces the optical axis position relative to the image pickup element by a distance greater than the size of the dead pixel.

16. An image pickup apparatus comprising:
an image pickup optical system having an optical axis and configured to form a subject image;
an image pickup element configured to pick up the subject image and output the picked-up subject image as an image;
an optical axis controlled configured to displace an optical axis position relative to the image pickup element every time image capturing is performed;

an image addition processor configured to correct positional displacement between a plurality of images output from the image pickup element and add the resulting images together; and an operation unit, wherein, when the image pickup element has a plurality of dead pixels, the optical axis controller displaces the optical axis position relative to the image pickup element such that the dead pixels do not overlap with one another after the plurality of images are added together.

17. An image pickup apparatus comprising:

an image pickup optical system having an optical axis and configured to form a subject image;

an image pickup element configured to pick up the subject image and output the picked-up subject image as an image;

an optical axis controller configured to displace an optical axis position relative to the image pickup element every time image capturing is performed;

an image addition processor configured to correct positional displacement between a plurality of image output from the image pickup element and add the resulting images together;

an operation unit; and a detecting unit configured to detect noise in the image pickup element, wherein the optical axis controller calculates an optical axis movement pattern for reducing noise detected by the detecting unit, and displaces the optical axis position relative to the image pickup element in accordance with the calculated optical axis movement pattern.

18. An image pickup apparatus comprising:

an image pickup optical system having an optical axis and configured to form a subject image;

an image pickup element configured to pick up the subject image and output the picked-up subject image as an image;

an optical axis controller configured to displace an optical axis position relative to the image pickup element every time image capturing is performed;

an image addition processor configured to correct positional displacement between a plurality of images output from the image pickup element and add the resulting images together;

an operation unit; and a motion vector detection processor configured to detect a motion by comparing a current image and a previous image output from the image pickup element, wherein the optical axis controller outputs optical axis displacement information to the image addition processor with respect to each image; and the image addition processor corrects positional displacement between the plurality of images on the basis of the optical axis displacement information output from the optical axis controller and vector information detected by the motion vector detection processor.

* * * * *